United States Patent
Friestad

(10) Patent No.: US 8,196,671 B2
(45) Date of Patent: Jun. 12, 2012

(54) OPENER DISK BLADE SCRAPER HINGE GEOMETRY TO MAINTAIN CONTACT WITH DEFLECTED DISK BLADE

(75) Inventor: Michael E. Friestad, Rock Island, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/405,487

(22) Filed: Mar. 17, 2009

(65) Prior Publication Data

US 2009/0255697 A1 Oct. 15, 2009

Related U.S. Application Data

(60) Provisional application No. 61/043,904, filed on Apr. 10, 2008.

(51) Int. Cl.
*A01B 15/16* (2006.01)
(52) U.S. Cl. ........................... 172/558; 172/559
(58) Field of Classification Search .................. 172/558, 172/559, 566
See application file for complete search history.

(56) References Cited

U.S. PATENT DOCUMENTS

| | | | | |
|---|---|---|---|---|
| 682,505 | A * | 9/1901 | Strong | 172/603 |
| 1,298,209 | A * | 3/1919 | Heylman | 172/558 |
| 1,721,876 | A * | 7/1929 | Davis et al. | 172/558 |
| 1,723,705 | A * | 8/1929 | Packer | 172/558 |
| 2,949,968 | A * | 8/1960 | Stoner | 172/166 |
| 4,736,803 | A | 4/1988 | Roush | |
| 4,998,488 | A * | 3/1991 | Hansson | 111/187 |
| 6,237,696 | B1 | 5/2001 | Mayerle | |
| 6,386,127 | B1 | 5/2002 | Prairie et al. | |
| 6,640,732 | B2 | 11/2003 | Prairie et al. | |
| 6,644,223 | B2 | 11/2003 | Prairie et al. | |
| 6,874,584 | B2 | 4/2005 | Butterfield et al. | |
| 7,481,279 | B2 * | 1/2009 | Blunier et al. | 172/558 |
| 2004/0149465 | A1 | 8/2004 | Butterfield et al. | |
| 2008/0264659 | A1 * | 10/2008 | Hoffman et al. | 172/558 |

FOREIGN PATENT DOCUMENTS

| | | |
|---|---|---|
| CA | 2 298 395 | 8/2001 |
| CA | 2 411 041 | 5/2004 |
| FR | 1 417 208 | 9/1964 |

* cited by examiner

*Primary Examiner* — Thomas Will
*Assistant Examiner* — Joel F. Mitchell
(74) *Attorney, Agent, or Firm* — Taylor IP, P.C.

(57) ABSTRACT

An agricultural machine includes a disk blade assembly having a hub and a disk blade mounted to the hub. The hub has a perimeter. The disk blade is deflectable by ground forces in an area outside of the hub. A scraper assembly includes a mount, a scraper blade, and a hinge pivotally interconnecting the scraper blade with the mount. The hinge has an axis of rotation which passes through a point generally at or near a bottom of the hub perimeter, and generally coincident with the disk blade.

11 Claims, 4 Drawing Sheets

OPENER DISK BLADE SCRAPER HINGE GEOMETRY TO MAINTAIN CONTACT WITH DEFLECTED DISK BLADE

CROSS REFERENCE TO RELATED APPLICATIONS

This is a non-provisional application based upon U.S. provisional patent application Ser. No. 61/043,904, entitled "OPENER DISK BLADE SCRAPER HINGE GEOMETRY TO MAINTAIN CONTACT WITH DEFLECTED DISK BLADE", filed Apr. 10, 2008, which is incorporated herein by reference.

FIELD OF THE INVENTION

The present invention relates to disk blade assemblies used with agricultural equipment, and, more particularly, to opener disk blade assemblies used with agricultural seeding machines.

BACKGROUND OF THE INVENTION

Soil adhering to disk blades leads to large accumulations of soil and crop residue between the disk blade and boot or scraper. This is known as "plugging" and requires the machine operator to stop and manually remove the debris before continuing. Previous attempts to address this problem included changed scraper shape, increased spring force between scraper and blade, and "jack bolts" to force contact between scraper and blade. Scraper shape alone has not been successful in eliminating the plugging. Greater spring force and jack bolts have been marginally successful but at the cost of increased wear, component breakage, and disk blade stoppage in loose, dry soil. In addition, the machine may be used to apply anhydrous ammonia (NH3) which aggravates the problem because wet soil will freeze and adhere to the disk blade. All known disk blade scraper designs have the limitation that they only match the disk blade shape in one condition, typically flat disk blade without soil pressure loading. The disk blade is typically placed at an angle relative to the forward travel direction of the seeding machine, and soil pressure during operation deflects the disk blade, resulting in a gap between the disk blade and scraper allowing soil to adhere to the blade (see FIG. 1 for exemplary deformation of an opener disk blade).

What is needed in the art is a scraper assembly which is less prone to plugging and better follows the contour of a disk blade when deflected during operation.

SUMMARY OF THE INVENTION

The invention in one form is directed to an agricultural machine, including a disk blade assembly having a hub and a disk blade mounted to the hub. The hub has a perimeter. A scraper assembly includes a mount, a scraper blade, and a hinge pivotally interconnecting the scraper blade with the mount. The hinge has an axis of rotation which lies generally tangent to the perimeter of the disk blade hub.

The invention in another form is directed to an agricultural machine, including a disk blade assembly having a hub and a disk blade mounted to the hub. The hub has an axis of rotation and a perimeter. A scraper assembly includes a mount, a scraper blade, and a hinge pivotally interconnecting the scraper blade with the mount. The hinge axis of rotation generally intersects with a substantially vertical line passing through the hub axis of rotation and coincident with the disk blade at an intersection point.

The invention in yet another form is directed to an agricultural machine, including a disk blade assembly having a hub and a disk blade mounted to the hub. The hub has a perimeter. The disk blade is deflectable by ground forces in an area outside of the hub. A scraper assembly includes a mount, a scraper blade, and a hinge pivotally interconnecting the scraper blade with the mount. The hinge has an axis of rotation which passes through a point generally at or near a bottom of the hub perimeter, and generally coincident with the disk blade.

DETAILED DESCRIPTION OF THE INVENTION

Figure 1:
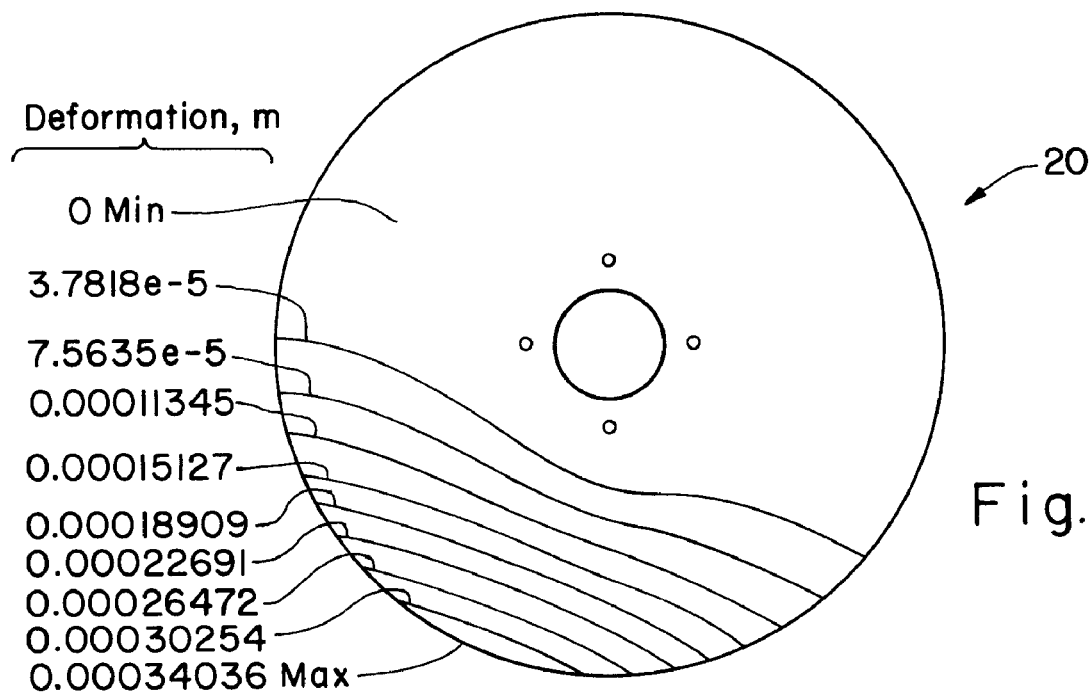
FIG. 1 illustrates exemplary deformation of a disk blade assembly for a disk opener on a seeding machine during use in soil.

Referring now to the drawings, and more particularly to FIG. 1, it can be seen that the total deformation of a disk blade, which is assumed to be attached to the hub in the illustration, increases in an area below the hub as the radius of a selected point of interest increases. In the area of the hub, the disk blade of course rotates with the hub about an axis of rotation of the hub, but is otherwise not deflectable by ground forces. In fact, it is observable from FIG. 1 that the deflection of the disk blade curves around and begins to deflect in an area immediately outside of and below the hub. Since the ground forces are only exerted against the disk blade in an area below the hub, conversely there are no substantial deflections in an area above the hub.

Figure 2:
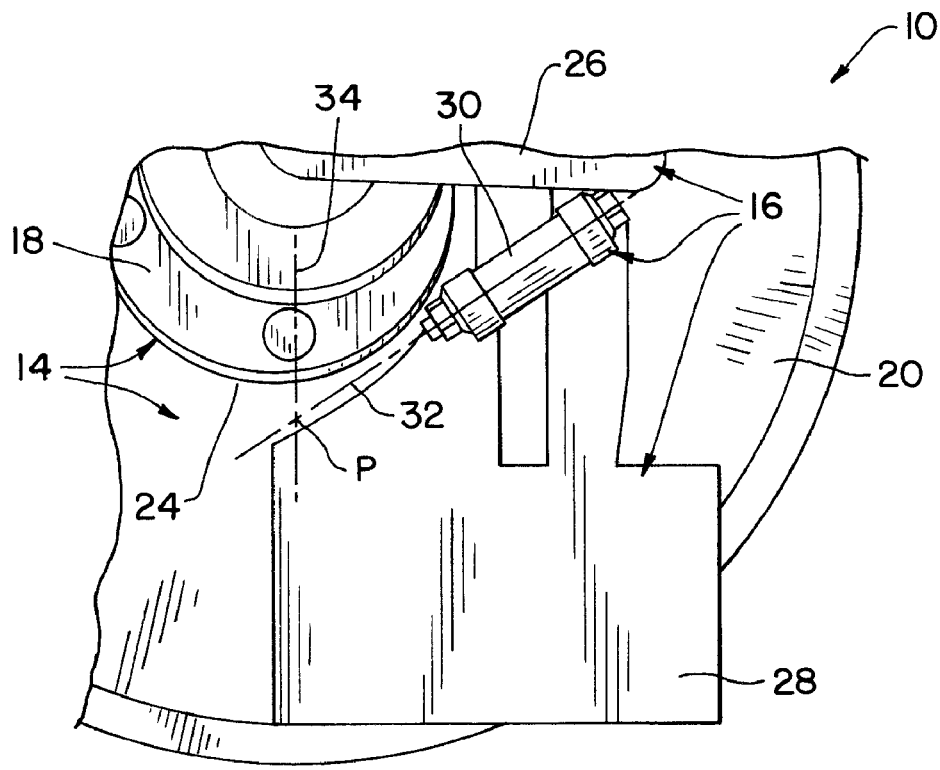
FIG. 2 is a side view of an embodiment of a scraper assembly of the present invention, positioned in association with a disk blade assembly.
Figure 3:
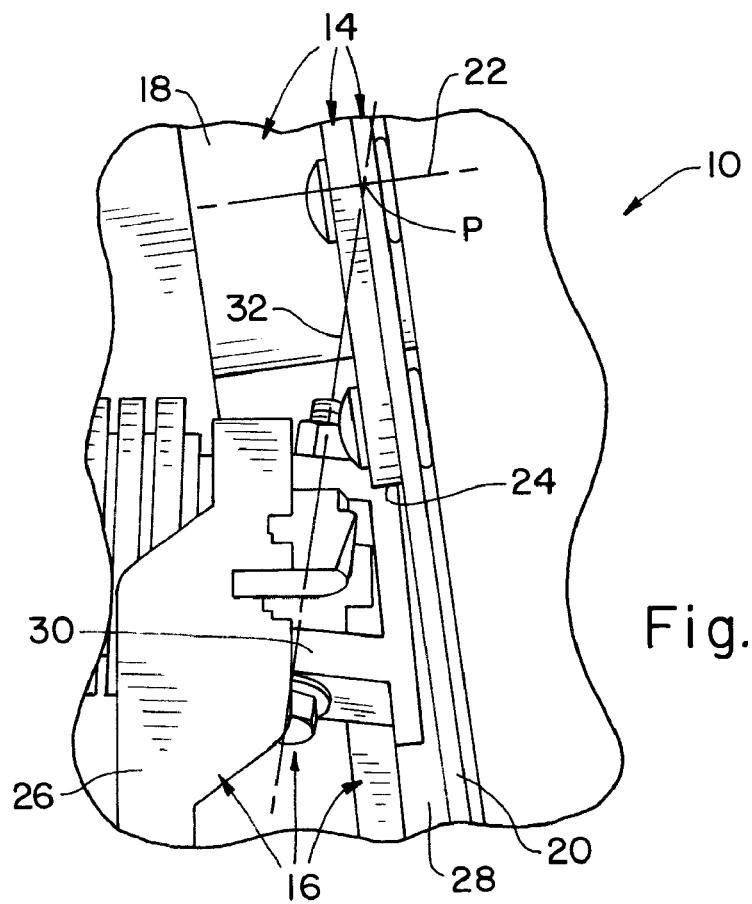
FIG. 3 is a top view of the scraper assembly and disk blade assembly shown in FIG. 2.
Figure 4:
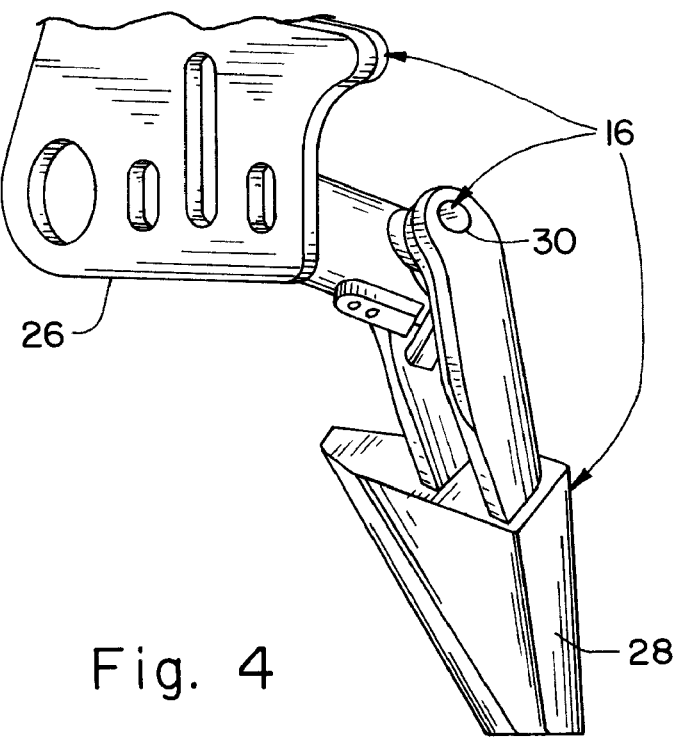
FIG. 4 is a perspective view of the scraper assembly shown in FIGS. 2 and 3.

Referring now to FIGS. 2-4, there is shown a portion of an agricultural machine 10, including a disk blade assembly 14 and a scraper assembly 16. In the embodiment shown, agricultural machine 10 is assumed to be a seeding machine in the form of a row crop planter and each disk blade assembly 14 is associated with a respective row unit (not shown). It is also possible that disk blade assembly 14 and scraper assembly 16 can be associated with a different type of agricultural machine, such as a chemical applicator in the form of a liquid or dry fertilizer, herbicide, and/or insecticide applicator.

Disk blade assembly 14 includes a hub 18 and a disk blade 20 which is mounted to hub 18. Hub 18 has an axis of rotation 22 and a perimeter 24. In the area radially within perimeter 24 of hub 18, disk blade 20 is substantially non deflectable by ground forces applied during application, and in an area radially outside of perimeter 24 disk blade 20 is deflectable by ground forces which are applied during operation.

Scraper assembly 16 includes a mount 26, scraper blade 28, and hinge 30. Mount 26 is attached to and carried by any suitable carrying structure associated with disk blade assembly 14, such as a suitable frame member or the like. Hinge 30, to be described in more detail below, interconnects scraper blade 28 with mount 26.

More particularly, scraper assembly 16 of the present invention is configured to follow the deflected disk blade shape, maintaining contact at all times to eliminate adhering soil and subsequent plugging. This effect is accomplished by choosing the scraper hinge angle to point generally toward the perimeter 24 of disk blade hub 18. Referring to FIG. 2, scraper assembly 16 has a hinge 30 with an axis of rotation 32 which generally lies along (i.e., is generally tangent to) the perimeter 24 of hub 18. As shown in FIGS. 2 and 3, axis of rotation 32 is also preferably positioned to generally align with a vertical line 34 passing through axis of rotation 22 of hub 18 at an intersection point P which is also immediately below hub 18 and generally coincident with disk blade 20.

Put another way, the axis of rotation 32 of hinge 30 is oriented to pass through a point coincident with disk blade 20 immediately below hub 18 where the deflections of disk blade 20 begin to occur during operation. This allows scraper blade 28 to more closely follow the contour of disk blade 20 when deflected during operation. The intersection point P is generally at the perimeter of hub 18, meaning that it need not be exactly at the perimeter of hub 18, but rather at or near hub 18 in an area below hub 18 where deflections begin to occur outside the perimeter 24.

Scraper blade 28 cannot exactly follow the disk blade 20 due to blade curvature when loaded but it's far closer than current production. In fact, scraper blade 28 will likely wear in to match nominal disk blade curvature and has been shown to keep disk blade 20 clean in representative field conditions. Field tests to date have shown effective disk blade cleaning with lower spring force. This is expected to reduce component wear for longer life. Of further benefit, scraper blade 28 can swing up a full 90 degrees and be self-clearing of plugs.

Figure 5:
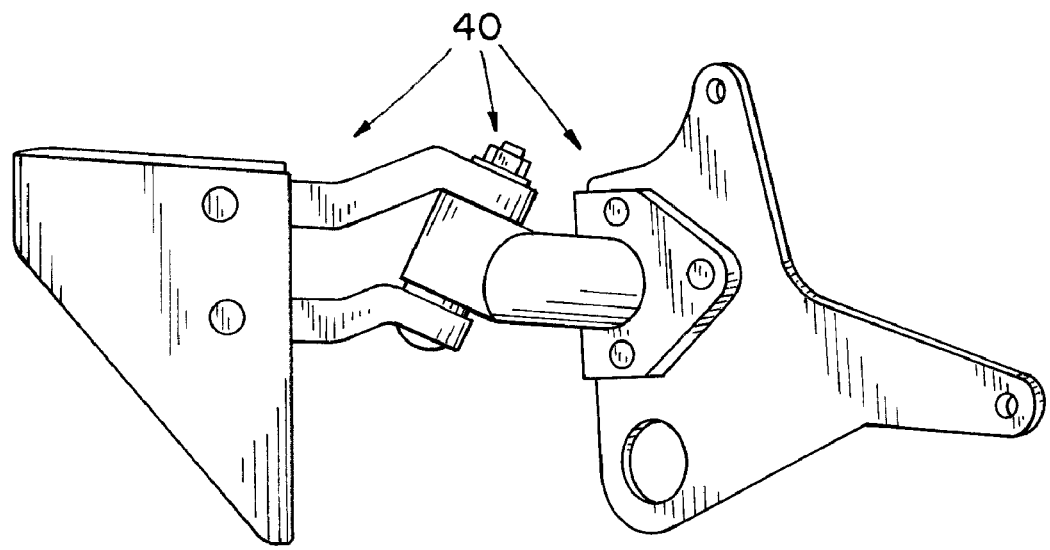
FIG. 5 is a perspective view of another embodiment of a scraper assembly of the present invention which has been tested during operation.
Figure 6:
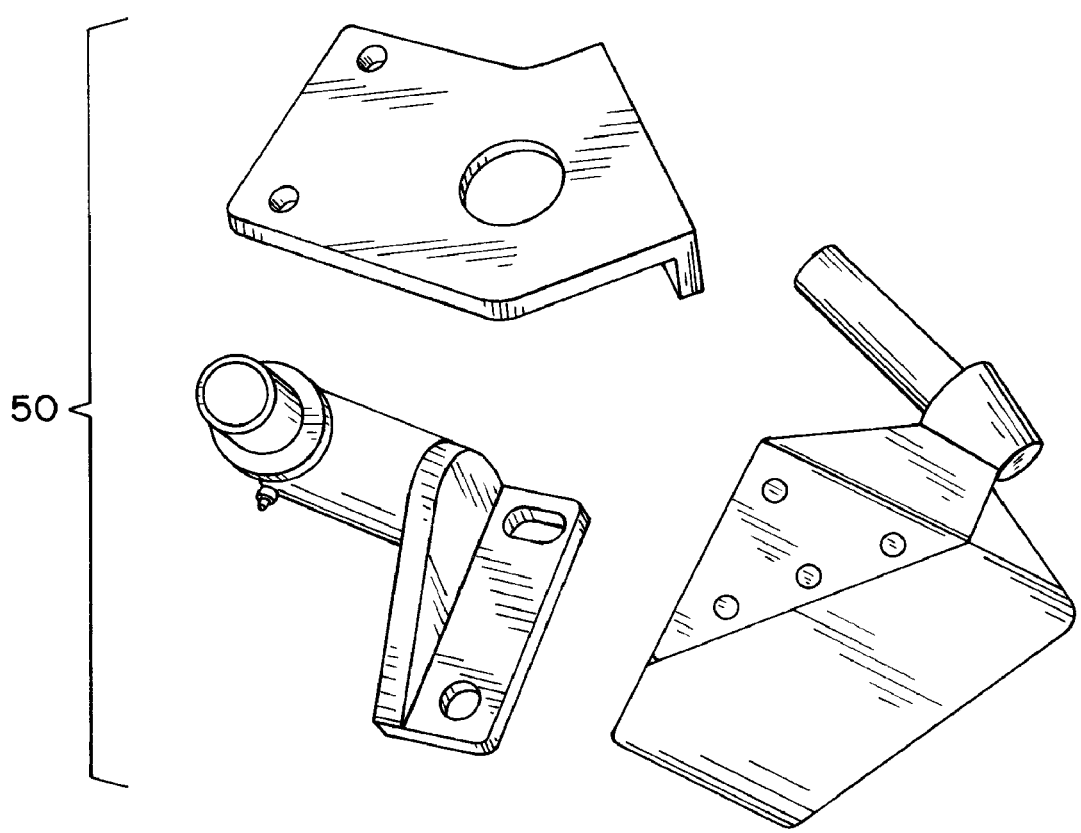
FIGS. 6 and 7 are disassembled views of yet another embodiment of a scraper assembly of the present invention which has been tested during operation.
Figure 7:
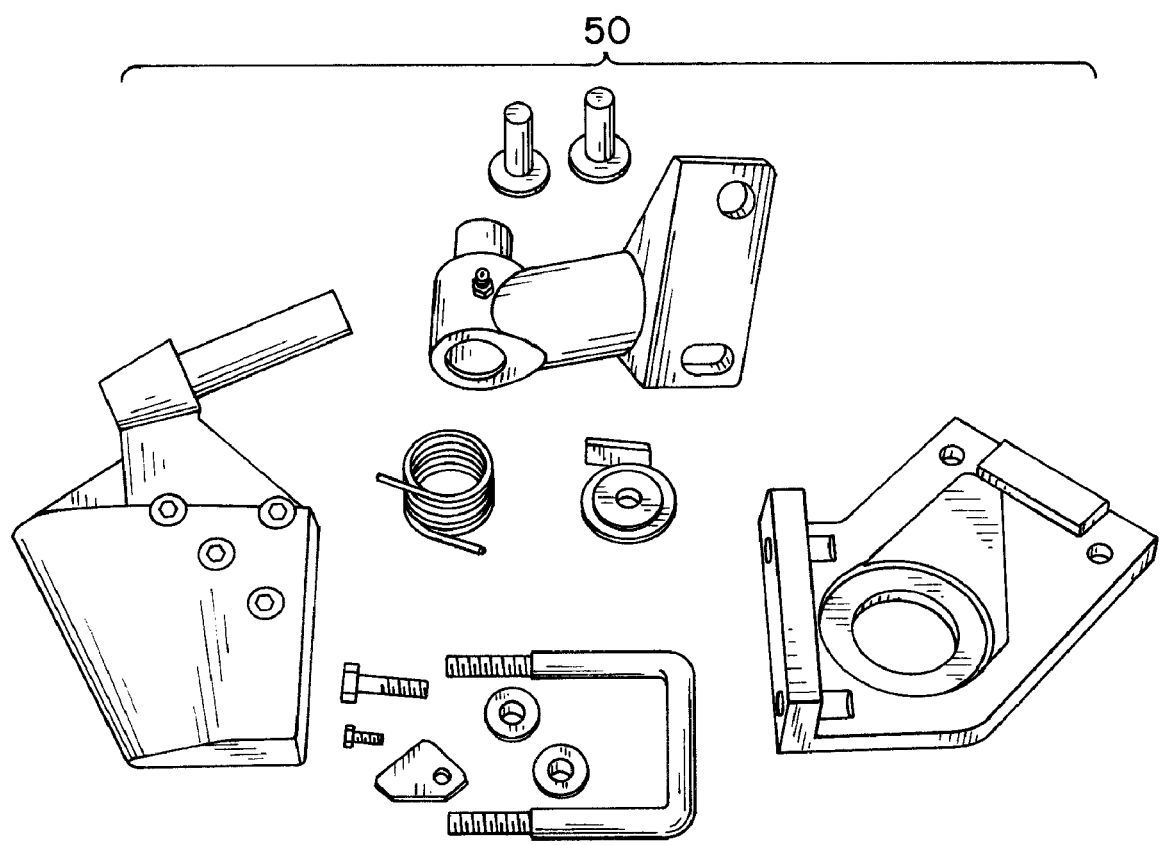

Referring to FIG. 5, there is shown an assembled, perspective view of an embodiment of a scraper assembly 40 of the present invention which has been tested to be effective during operation. FIGS. 6 and 7 illustrate disassembled views of another embodiment of a scraper assembly 50 of the present invention which has been tested to be effective during operation.

Having described the preferred embodiment, it will become apparent that various modifications can be made without departing from the scope of the invention.

The invention claimed is:

1. An agricultural machine, comprising:
    a disk blade assembly including a hub and a disk blade mounted to said hub, said hub having a perimeter and an axis of rotation; and
    a scraper assembly including:
        a mount;
        a scraper blade including a scraper portion adjacent said disk blade; and
        a hinge pivotally interconnecting said scraper blade with said mount, said hinge having an axis of rotation which intersects with said disk blade at a point which is at or immediately below a bottom of said perimeter of said disk blade hub, in an area beginning flexure of said disk blade as a result of ground forces applied to said disk blade, said hinge axis of rotation intersecting with a substantially vertical line passing through said hub axis of rotation and contacting at least a part of said disk blade substantially at said point, said point being located radially inwardly of said scraper portion of said scraper blade relative to said disk blade.

2. The agricultural machine of claim 1, wherein said substantially vertical line is generally coincident with said disk blade at said point.

3. The agricultural machine of claim 1, wherein said disk blade is substantially not deflectable by ground forces in an area of said hub, and said disk blade is deflectable by ground forces in an area below said hub.

4. The agricultural machine of claim 1, wherein said agricultural machine is one of a seeding machine and a chemical applicator.

5. An agricultural machine, comprising:
    a disk blade assembly including a hub and a disk blade mounted to said hub, said hub having an axis of rotation and a perimeter; and
    a scraper assembly including:
        a mount;
        a scraper blade including a scraper portion adjacent said disk blade; and
        a hinge pivotally interconnecting said scraper blade with said mount, said hinge having an axis of rotation intersecting with a substantially vertical line passing through said hub axis of rotation, said hinge axis of rotation further intersecting with said disk blade at an intersection point which is at or below a bottom of said hub perimeter, said substantially vertical line contacting at least a part of said disk blade substantially at said intersection point, said intersection point being located radially inwardly of said scraper portion of said scraper blade relative to said disk blade.

6. The agricultural machine of claim 5, wherein said disk blade is substantially not deflectable by ground forces in an area of said hub, and said disk blade is deflectable by ground forces in an area below said hub.

7. The agricultural machine of claim 5, wherein said agricultural machine is one of a seeding machine and a chemical applicator.

8. An agricultural machine, comprising:
    a disk blade assembly including a hub and a disk blade mounted to said hub, said hub having a perimeter and an axis of rotation, said disk blade being deflectable by ground forces in an area outside of and below said hub; and
    a scraper assembly including:
        a mount;
        a scraper blade including a scraper portion adjacent said disk blade; and
        a hinge pivotally interconnecting said scraper blade with said mount, said hinge having an axis of rotation which intersects with said disk blade at a point which is at or below a bottom of said hub perimeter and which intersects with a substantially vertical line passing through said hub axis of rotation and contacting at least a part of said disk blade substantially at said point, said point being located radially inwardly of said scraper portion of said scraper blade relative to said disk blade.

9. The agricultural machine of claim 8, wherein said substantially vertical line is generally coincident with said disk blade at said point.

10. The agricultural machine of claim 8, wherein said disk blade is substantially not deflectable by ground forces in an area of said hub, and said disk blade is deflectable by ground forces in an area below said hub.

11. The agricultural machine of claim 8, wherein said agricultural machine is one of a seeding machine and a chemical applicator.

* * * * *